US010083357B2

United States Patent
Masters et al.

(10) Patent No.: US 10,083,357 B2
(45) Date of Patent: Sep. 25, 2018

(54) IMAGE-BASED ITEM LOCATION IDENTIFICATION

(71) Applicant: Amazon Technologies, Inc., Seattle, WA (US)

(72) Inventors: Nathan Eugene Masters, Redmond, WA (US); Shiblee Imtiaz Hasan, Seattle, WA (US); Joseph Edwin Johnson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/583,744

(22) Filed: May 1, 2017

(65) Prior Publication Data
US 2018/0157913 A1  Jun. 7, 2018

Related U.S. Application Data

(63) Continuation of application No. 14/579,522, filed on Dec. 22, 2014, now Pat. No. 9,665,960.

(51) Int. Cl.
*G09G 5/00* (2006.01)
*G06K 9/00* (2006.01)
*G06F 3/0482* (2013.01)
*G06T 13/80* (2011.01)

(52) U.S. Cl.
CPC ....... *G06K 9/00671* (2013.01); *G06F 3/0482* (2013.01); *G06T 13/80* (2013.01); *G06T 2200/24* (2013.01)

(58) Field of Classification Search
None
See application file for complete search history.

(56) References Cited

U.S. PATENT DOCUMENTS

| 5,530,652 | A  | 6/1996  | Cryole et al. |
| 7,121,469 | B2 | 10/2006 | Dorai et al. |
| 7,707,008 | B1 | 4/2010  | Champlin et al. |
| 7,970,661 | B1 | 6/2011  | Abraham et al. |
| 8,315,423 | B1 | 11/2012 | Jing et al. |

(Continued)

FOREIGN PATENT DOCUMENTS

| WO | WO 2013/063299 A1 | 5/2013 |
| WO | WO 2016/106014 A1 | 6/2016 |

OTHER PUBLICATIONS

Search Report and Written Opinion dated Mar. 15, 2016 in PCT Application No. PCT/US2015/065711.

*Primary Examiner* — Kyle Zhai
(74) *Attorney, Agent, or Firm* — Knobbe, Martens, Olson & Bear, LLP

(57) ABSTRACT

Systems and methods are provided for augmenting or annotating image data to help a user locate an item among a number of items in a physical environment. The systems disclosed herein can access an image of a location that includes a number of items. The systems may then identify the items and the location of the items within the image. Further, the systems may create an interactive alternative visualization of the identified items to facilitate a user locating a particular item. For example, the alternative visualization may include presenting an ordered set of thumbnails corresponding to the items. The user can select the desired item using the alternative visualization and the systems can annotate a location within the image where the item can be located, thereby enabling the user to locate the item in the physical environment.

20 Claims, 8 Drawing Sheets

(56) References Cited

U.S. PATENT DOCUMENTS

| | | |
|---|---|---|
| 8,391,642 B1 | 3/2013 | Petruszka et al. |
| 8,560,406 B1 | 10/2013 | Antony |
| 8,725,573 B1 | 5/2014 | Narang et al. |
| 8,725,595 B1 | 5/2014 | Siegel et al. |
| 9,327,406 B1 | 5/2016 | Hinterstoisser et al. |
| 9,665,960 B1 | 5/2017 | Masters et al. |
| 2002/0002511 A1 | 1/2002 | Yim et al. |
| 2004/0010430 A1 | 1/2004 | Cinquini et al. |
| 2004/0201752 A1 | 10/2004 | Parulski et al. |
| 2005/0044011 A1 | 2/2005 | Deal |
| 2005/0060269 A1 | 3/2005 | Gaikoski |
| 2008/0077511 A1 | 3/2008 | Zimmerman |
| 2009/0323084 A1 | 12/2009 | Dunn et al. |
| 2010/0110073 A1 | 5/2010 | Abraham et al. |
| 2012/0081357 A1 | 4/2012 | Habbecke et al. |
| 2012/0113223 A1 | 5/2012 | Hilliges et al. |
| 2012/0284012 A1 | 11/2012 | Rodriguez et al. |
| 2013/0106910 A1 | 5/2013 | Sacco |
| 2013/0215116 A1 | 8/2013 | Siddique et al. |
| 2013/0258117 A1 | 10/2013 | Penov et al. |
| 2014/0135966 A1 | 5/2014 | Pettersson et al. |
| 2014/0244430 A1 | 8/2014 | Siegel et al. |
| 2014/0270477 A1 | 9/2014 | Coon |
| 2015/0187091 A1 | 7/2015 | Hata et al. |
| 2015/0202962 A1 | 7/2015 | Habashima et al. |
| 2016/0117749 A1 | 4/2016 | Desmarais et al. |
| 2016/0180193 A1 | 6/2016 | Masters et al. |
| 2016/0180441 A1 | 6/2016 | Hasan et al. |
| 2017/0243352 A1 | 8/2017 | Kutliroff et al. |

IMAGE-BASED ITEM LOCATION IDENTIFICATION

CO-PENDING APPLICATIONS

The present application is a continuation of U.S. application Ser. No. 14/579,522, which is titled "IMAGE-BASED ITEM LOCATION IDENTIFICATION" and was filed on Dec. 22, 2014, the disclosure of which is hereby incorporated by reference in its entirety herein. Further, U.S. application Ser. No. 14/579,522 was filed on the same day as U.S. application Ser. No. 14/579,536, which is titled "IMAGE-BASED COMPLEMENTARY ITEM SELECTION" and was filed on Dec. 22, 2014, and U.S. application Ser. No. 14/579,417, which is titled "ITEM PREVIEW IMAGE GENERATION" and was filed on Dec. 22, 2014, the disclosures of which are hereby incorporated by reference in their entirety herein.

BACKGROUND

Some individuals have large collections of particular items, such as books, DVDs, or dolls. For some of these individuals, it can be difficult to locate a particular item within the collection because, for example, the collection is so large or is not well organized. Further, organizing a large collection of items can be time-consuming. Moreover, an organized collection of items may become disorganized over time as the items are used or as more items are collected.

In some cases, a number of items may be placed in a particular location making it difficult to locate a particular item. For example, an individual may have a particular drawer or other location where the individual places items that do not have a designated location in the individual's home or office. In some cases, the items may be placed haphazardly and over time may be more difficult to locate as more items are placed in the drawer. Locating an item in such a case can be both time-consuming and frustrating. Moreover, it can be difficult for a person to determine whether he or she owns or still owns the item when it is difficult to find the item.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Figure 1A:
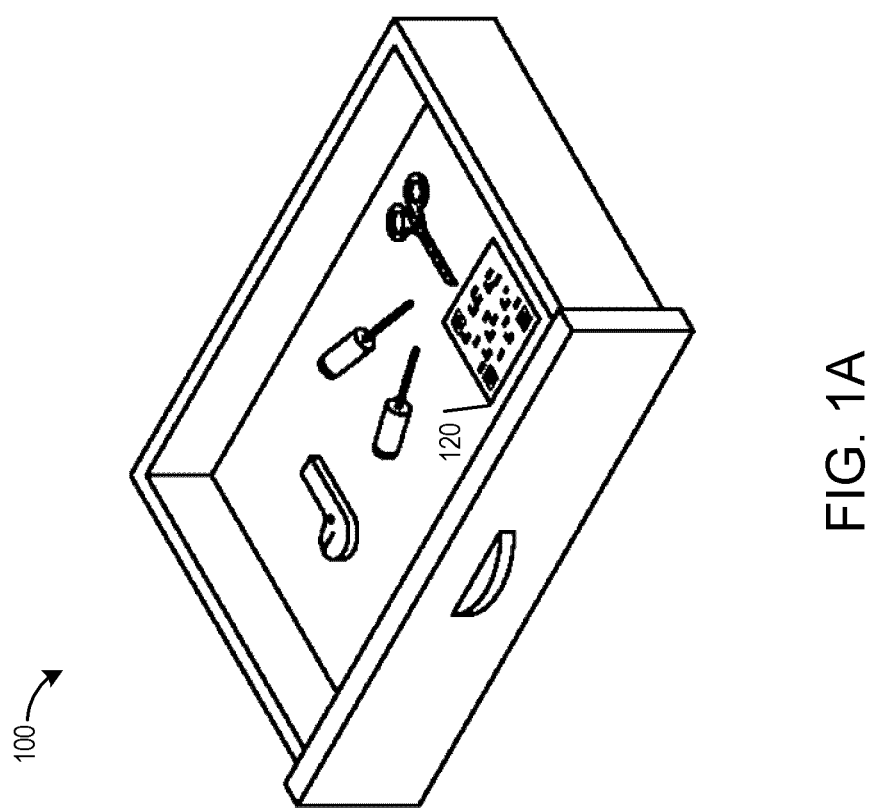
FIG. 1A is a pictorial diagram illustrating an example of a storage space storing a number of items.

An individual who believes he or she owns a particular item, but who cannot easily locate the item may become frustrated. Moreover, in some cases, the individual may waste money repurchasing an item that he or she cannot locate. Thus, providing a solution to more easily locate an item among a set of items can both decrease stress and save money for an individual.

Embodiments of systems and processes described herein can facilitate a user locating an item by processing an image of a physical area and/or set of items and annotating the image to identify a location of the item in the image that corresponds to a location of the item in the physical area. Generally, the physical area refers to a real-world location, such as a location at a user's house or office (e.g., a closet, a drawer, a floor of a room, etc.). Although this disclosure primarily focuses on finding items in physical areas or locations, it should be understood that embodiments disclosed herein can be applied to locating items in an image, or in a digital or electronic location. For instance, an image can be captured of a picture in a book or of something displayed on a screen (e.g., a screen capture). Thus, in some embodiments, the image can be annotated to help a user locate an item in the picture of the book or in the content displayed on the screen.

Further, embodiments of systems and processes described herein can generate an alternative or supplemental image of items that are depicted in a captured or received image. This alternative or supplemental image of the items depicted in the captured image may be presented to a user instead of or in addition to the captured image. Further, the alternative or supplemental image may depict the items from the captured image in an organized view enabling the user to more easily identify an item of interest. The user can select the item of interest by, for example, interacting with the supplemental image. Embodiments of systems and processes herein can annotate the captured image to indicate the portion of the captured image that depicts the item selected at the supplemental image. Using the annotated image as a guide, a user can more easily locate the item of interest in the physical area depicted by the captured image.

Embodiments of systems and processes described herein may take advantage of augmented reality techniques to present a modified image to a user that differs from an original image captured by an image capturing device (e.g., a camera or video camera). Although the modified image may be presented at a different time than when the original image is captured, often the modified image is presented to the user substantially in real-time as the original image is being captured. In the present context, displaying the modified image substantially in real-time may include displaying the modified image simultaneously with the original captured image, or it may include displaying the modified image at a slightly delayed time to enable a computing device to make the modifications to the originally captured image. This slightly delayed time may be a delay of less than a threshold amount of time that is imperceptible to the average user. Thus, usually the amount of time between when the original or initial image is captured and when the modified image is output on a display for presentation to a user is sufficiently short such that the user does not perceive the time delay. For example, the delay may be a few microseconds or milliseconds. In other cases, the delay may be perceptible, but is sufficiently short to enable the user to identify the location of an item without the item being moved. For instance, the delay may be a few seconds or a minute.

Augmented reality may enable a user to view on a screen of a user computing device an image with annotations or additional information. In some cases, an image captured by an optical device (e.g., a video camera) of a user computing device can be modified or supplemented and presented to the user on a display of the user computing device with the changes to the captured image. For example, a camera of a smartphone may capture images of a street that a user is walking along. The display of the smartphone may display the captured image of the street and may overlay arrows indicating which direction the user should turn to reach a particular destination.

It will be appreciated that references to an "image" herein may broadly refer to image data that may be temporarily or transiently stored, such as a frame of a video feed or other image data feed received from, for example, a camera device or video device as the device is capturing and processing a continuous stream of frames. Accordingly, an image may refer to a single frame that is processed and briefly presented to a user in a continuous presentation of different frames, whether or not such an image is stored more than transiently during, before or after being processed and presented. In other embodiments, an image processed and/or annotated as described herein may be an image file previously stored to an electronic data store. In addition, as used herein, the term "item" is used interchangeably to refer to an item itself (e.g., a particular good, service, bundle of goods/services or any combination thereof) and to its description or representation in a computer system, such as an electronic catalog system. As will be apparent from the context in which it is used, the term is also sometimes used herein to refer only to the item itself or only to its representation in the computer system.

Embodiments of systems and processes described herein may use augmented reality to identify the location of an item within an image by modifying the image to annotate or highlight a portion of the image that includes the item. Thus, while a user is capturing an image of a set of items with an image capture device, such as a camera, the user's device may be displaying an annotated version of the captured image that identifies the location of the item in the image. The user can then use the location of the item in the image to find the item in a physical location being viewed by the image capturing device.

Example Annotated Images

FIG. 1A illustrates an example of a storage space 100 storing a number of items. For example, the storage space 100 may be a drawer with a number of tools, such as screwdrivers, tape, and scissors. The storage space 100 reflects a physical location at a user's home or office, as opposed to a picture or digital image. Further, as illustrated in FIG. 1A, a user may place a reference object 120 within the drawer. This reference object 120 may include any type of object with dimensions previously provided to an interactive computing system and that can be used to determine the dimensions of items in the storage space 100. In some cases, the reference object 120 may be omitted.

Figure 1B:
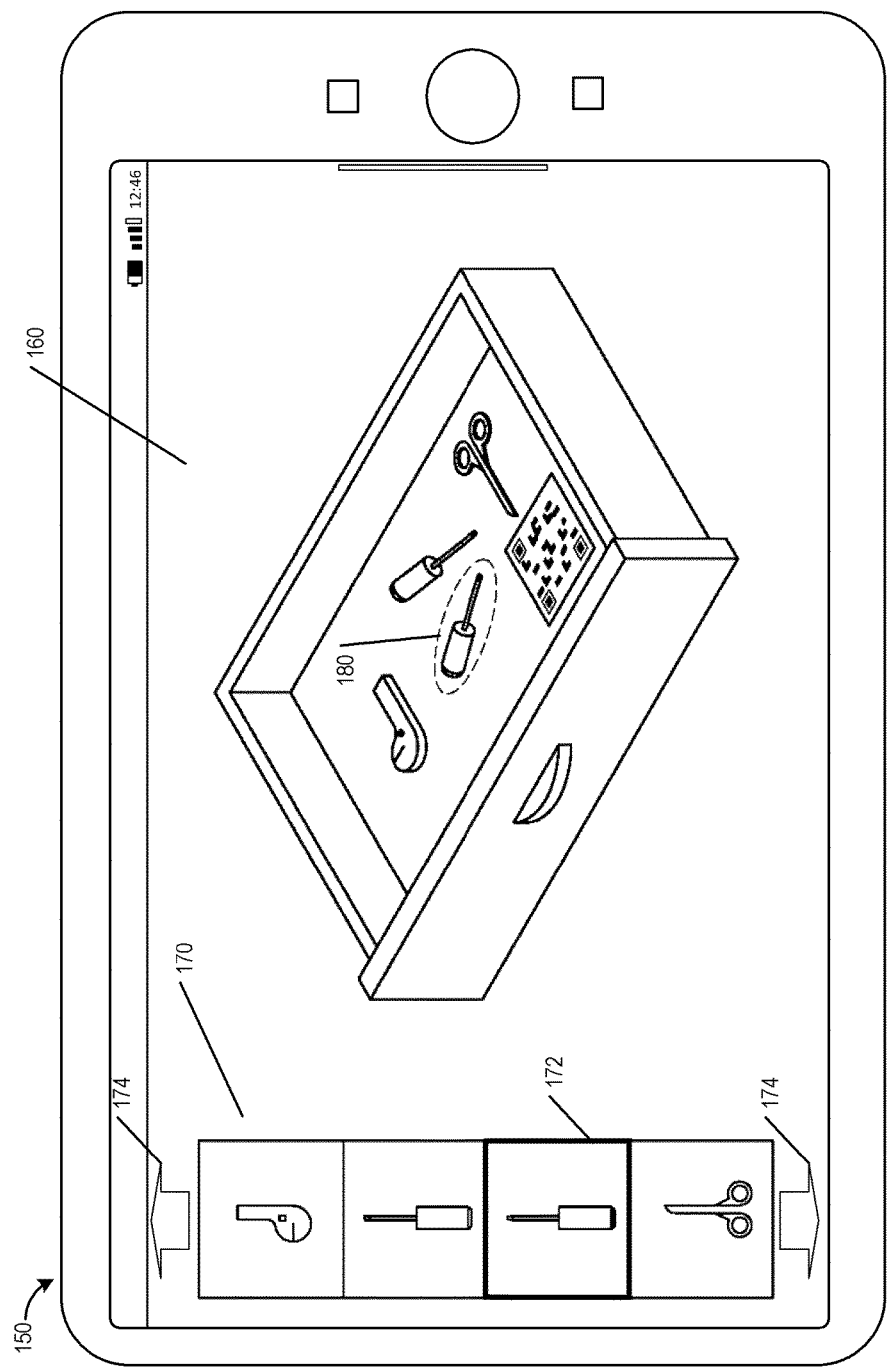
FIG. 1B is a pictorial diagram of an example of an augmented image, which may be generated at least in part by an interactive computing system described herein, depicting the storage space of FIG. 1A, where the augmented image includes an alternative visual representation of items in a captured image and an annotation of an item in the captured image.

FIG. 1B illustrates an example of an augmented image 160, which may be generated at least in part by an interactive computing system described herein, depicting the storage space 100 of FIG. 1A that includes an alternative visual representation 170 of items in a captured image and an annotation 180 of an item in the captured image. The augmented image 160 may be presented to a user on a user computing device 150. The alternative visual representation 170 may be generated at least in part by the user computing device 150. Alternatively, another computing device may generate the alternative visual representation 170 and provide it to the user computing device 150 for presentation to the user. As illustrated in FIG. 1B, the alternative visual representation 170 depicts the items located in the storage space 100, and consequently an image of the storage space 100.

The illustrative alternative visual representation 170 of FIG. 1B is a vertical stack or ribbon of images, icons, or thumbnails representing the items depicted in the augmented image 160. However, the alternative visual representation 170 is not limited as such and can include other alternative visual representations of the items of the image of the storage space 100, such as a matrix of items, or a graphical scroll wheel. In some cases, a subset of items is depicted in the alternative visual representation 170. A user may access additional items by interacting with the alternative visual representation, such as be selecting an arrow 174.

In the illustrated example of FIG. 1B a user has selected an icon 172 corresponding to an item from the alternative visual representation 170. This selection is illustrated by the thicker bounding box surrounding the icon 172. The icon 172 may be a copy of the portion of the image that includes the corresponding item, a rotated view of the portion of the image that includes the corresponding item, or another image that is used to represent the corresponding item. As a result of the selection of icon 172, an annotation 180 has been added to the augmented image 160 to illustrate a location of the item corresponding to the icon 172. In the illustrated embodiment, the annotation 180 is presented to the user as a dashed oval surrounding the requested item. It will be appreciated that a variety of annotation types or styles may be used in other embodiments, as will be discussed below. Using the information presented to the user, the user can locate the item (e.g., a screwdriver) in the storage space 100. In some embodiments, a user may provide feedback indicating that the systems described herein have identified the wrong item in the image corresponding to the icon 172. In some such cases, the user may reclassify the item annotated in the image enabling the systems described herein to improve the item recognition algorithms disclosed herein. For example, if a pair of scissors is annotated in the image instead of a screwdriver, a user may indicate that an incorrect item was identified and may provide identification information for the scissors.

Figure 2A:
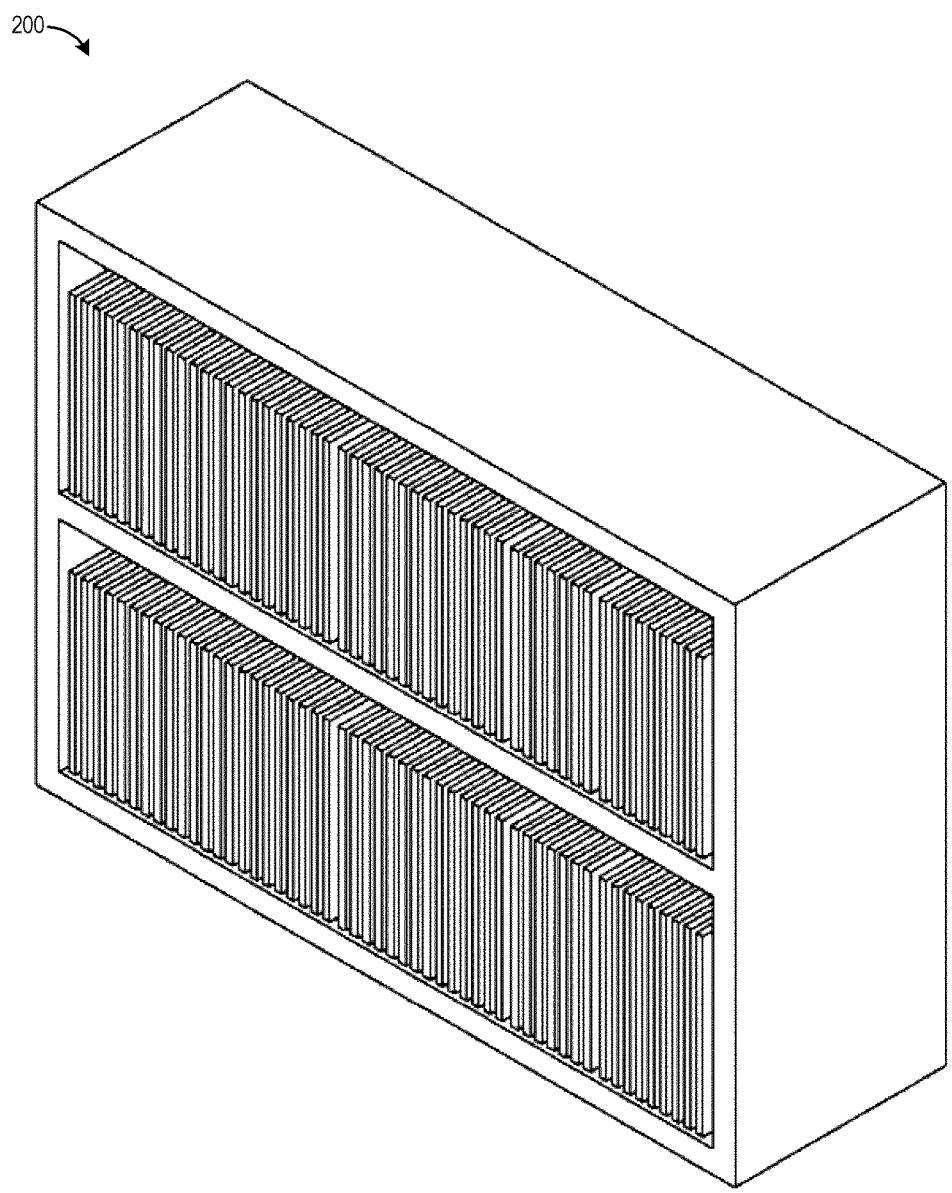
FIG. 2A is a pictorial diagram illustrating a second example of a storage space storing a number of items.

FIG. 2A illustrates a second example of a storage space 200 storing a number of items. In the illustrated example, the storage space may be a bookcase or a set of shelves and the items may be books, CDs, or DVDs. In this example, a reference object has not been placed in the physical environment to assist in identifying items. Instead, for instance, the items may be identified by performing an optical character recognition ("OCR") process on an image of the storage space 200 and identifying the items based on text on the spine of the books or media cases.

Figure 2B:
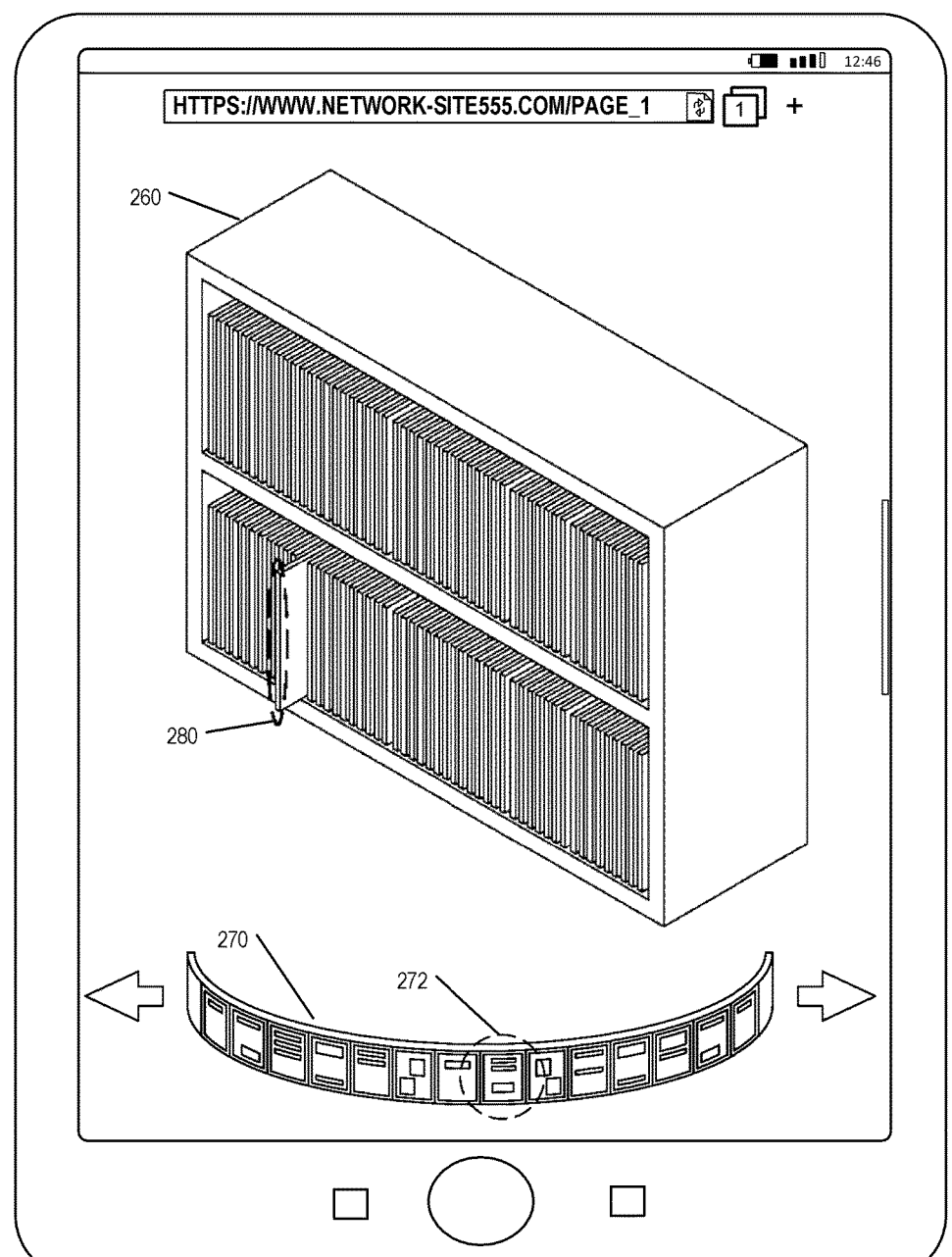
FIG. 2B is a pictorial diagram illustrating a second example of an augmented image, which may be generated at least in part by an interactive computing system described herein, depicting the storage space of FIG. 2A, where the augmented image includes an alternative visual representation of items in a captured image and an annotation of an item in the captured image.

FIG. 2B illustrates a second example of an augmented image 260, which may be generated at least in part by an interactive computing system described herein, depicting the storage space 200 of FIG. 2A that includes an alternative visual representation of items 270 in a captured image and an annotation 280 of an item in the captured image. The augmented image 260 may be depicted on a user computing device 250. As illustrated in FIG. 2B, the alternative visual representation 270 of the items of the storage space 200 may be a scroll wheel that includes icons or images of items stored in the storage space 200 in an alternative view. In other words, while the items in the storage space 200 are viewable by their spine, the icons in the alternative visual representation 270 illustrate the front cover of the items (e.g., DVD cases). In some cases, the alternative visual representation 270 may be used to help a user determine the items the user owns or to which the user has access. For example, a user may want to determine whether he or she owns particular books or movies and may or may not be attempting to identify the location of the book or movie in the user's collection. In such cases, the user may use embodiments disclosed herein to create the alternative visual representation 270 of the user's collection to facilitate to determining what items are in the user's possession.

As indicated by the annotation encircling icon 272 and the corresponding portion 280 of the augmented image 260, a user has selected a particular item. This particular item is depicted in the portion 280 of the augmented image 260. Further, as can be seen by comparing FIG. 2B to FIG. 2A, the annotation includes modifying the augmented image 260 to illustrate a partial removal of the item from the shelf thereby making it easier for a user to identify the item in the physical space. In some cases, the annotation may include animating the portion 280 of the augmented image to illustrate the removal of the corresponding item from the storage space. In some embodiments, the animation of the item being "virtually" removed from the shelf may be presented over (or superimposed within) a continuous video feed presented substantially in real time as a user points a camera of the user computing device 250 towards the scene depicted in FIG. 2A. In some such embodiments, the display position of the annotated and/or animated portion 280 may be continuously or repeatedly updated to generally match the position of the corresponding item as the user moves the camera. Further, in some cases, complementary content may be presented to the user upon selection of the item represented by the icon 272. For instance, a movie trailer or an excerpt of a book may be displayed corresponding to the item represented by the icon 272.

Example Networked Computing Environment

Figure 3:
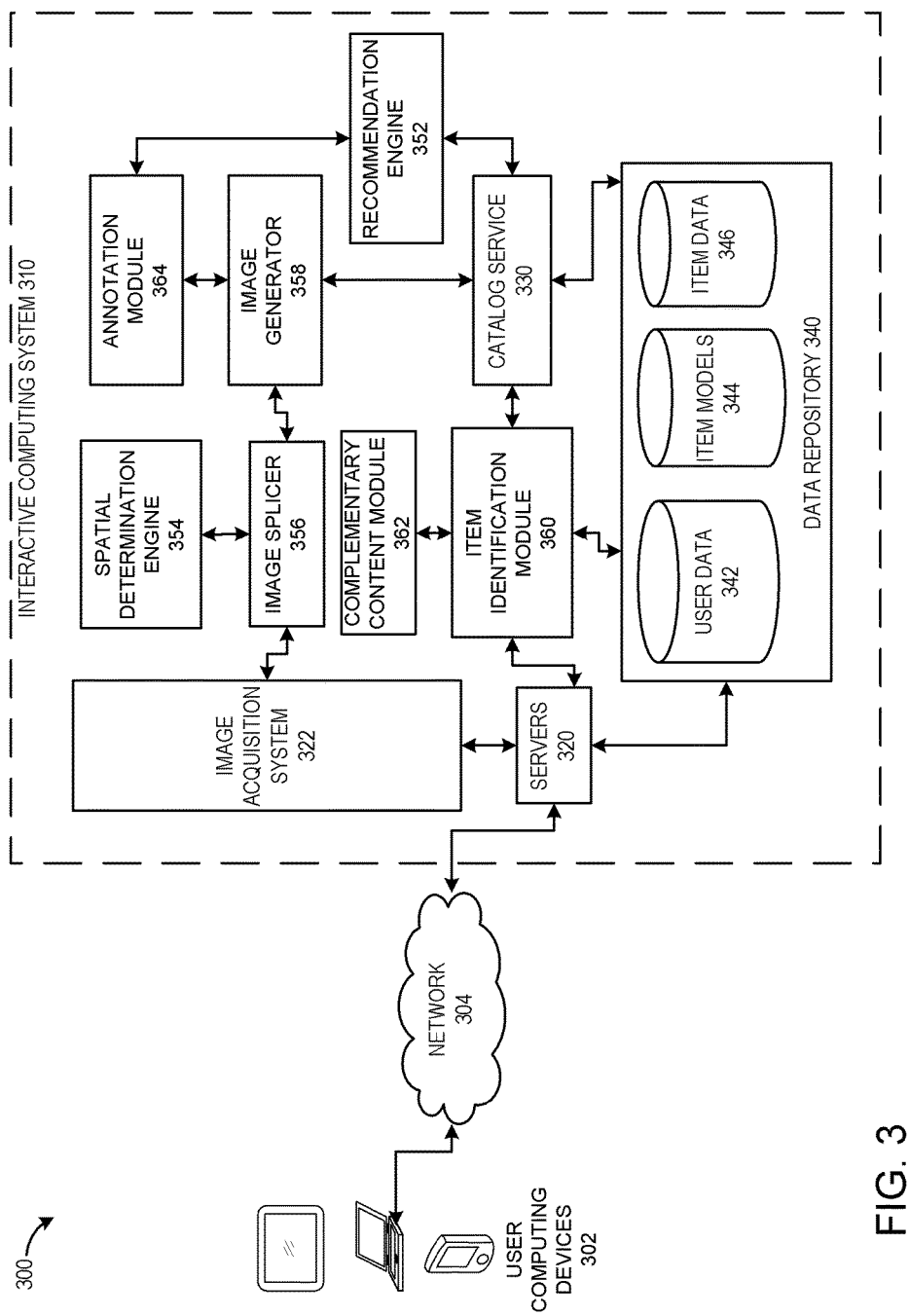
FIG. 3 is a block diagram illustrating an embodiment of a networked computing environment for implementing features described herein.

FIG. 3 illustrates an embodiment of a networked computing environment 300 that can implement the features described herein. The networked computing environment 300 may include a number of user computing devices 302 that can communicate with an interactive computing system 310 via a network 304. The interactive computing system 310 can generally include any system that can create an alternative representation of items depicted in an image and, in some cases, annotate the image to identify the location of a selected item in the image. Generally, although not necessarily, a user may select the item by interacting with the alternative representation of the items. Thus, in some cases, the alternative representation may be an interactive element or an interactive user interface element.

In some cases, the interactive computing system 310 may host a network application for creating an alternative representation of the items depicted in the image. Moreover, the network application may be capable of providing complementary content for an item included in the image and/or recommendations based on the item. The interactive computing system 310 may be associated with a network or Internet-based store or retailer. In some cases, the interactive computing system 310 may be associated with an Internet-based store that is affiliated with a brick-and-mortar store or retailer.

The interactive computing system 310 can include a number of systems that facilitate implementing the processes described herein. In the depicted embodiment, the interactive computing system 310 includes several components that can be implemented in hardware and/or software. For instance, the interactive computing system 310 can include one or more servers 320, which may be implemented in hardware, for receiving and responding to network requests from user computing devices 302. However, some of the capabilities of the servers 320 may be implemented in software. The one or more servers 320 can include web servers, application servers, database servers, combinations of the same, or the like.

Further, the interactive computing system 310 may include a catalog service 330, which may provide an electronic catalog of items. Information about items included in the electronic catalog may be stored and accessed from an item data repository 346. Users can browse or search the electronic catalog provided by the catalog service 330 by accessing the servers 320 and/or querying a search engine (not shown) hosted by the interactive computing system 310.

The electronic catalog content can include information about items (e.g., goods and/or services. In one embodiment, this content is arranged in a hierarchical structure, having items associated with one or more categories or browse nodes in a hierarchy. The catalog service 330 can provide functionality for users to browse the item hierarchy in addition to searching the catalog via a search engine.

In some cases, the hierarchical structure can include a tree-like structure with browse nodes that are internal nodes and with browse nodes that are leaf nodes. The internal nodes generally include children or descendent nodes and the leaf nodes generally do not include children nodes. The internal nodes may be associated with an item category or classification, which can include sub-classifications. The sub-classifications may represent additional internal nodes or leaf nodes. The leaf nodes may be associated with an item category or classification that does not include sub-classifications. In some implementations, the internal nodes are associated with item classifications and sub-classifications, but not items, and the leaf nodes are associated with the items. In other implementations, both the internal and leaf nodes may be associated with items.

Users can select an item or item represented in the hierarchy or in a list of search results to see more details about the item. In response to a user's item selection, the server 320 can provide to a user computing device 302 a catalog page (sometimes called an item detail page) that includes details about the selected item.

The interactive computing system 310 also includes a recommendation engine 352. The recommendation engine 352 can generally include any system for recommending one or more items to a user associated with the user computing devices 302. The recommendation engine 352 may recommend an item or service in response to a request from a user or from an administrator associated with the interactive computing system 310. In one embodiment, the recommendation engine 352 may recommend an item automatically without receiving a user request. In some cases, the recommendation engine 352 may recommend an item or service to a user in response to a passage of time since a previous purchase by the user.

In some embodiments, a user may request a recommendation of one or more items, or services, by providing access to an image of one or more other items and/or by selecting an image of an item form the one or more other items. The recommendation engine 352 may identify items to recommend based on the items depicted in the image. In some cases, the recommended items are similar items to the items in the image. For example, the recommended items may be of the same type or genre, or may be used in a similar manner (e.g., played in the case of games, or viewed in the case of movies). In other cases, the recommended items may be complementary items to the items illustrated or depicted in the image. The complementary items may include items that are of a different type than the items illustrated in the image, but that can be used in conjunction with the items of the image. For instance, the complementary items may be an organizer items that can be used to organize and/or store the items illustrated in the image. As further non-limiting examples, the complementary items may be batteries, protective cases, or add-ons (e.g., expansions to board games or downloadable content for video games) that can be used with the items illustrated in the image. In other cases, the recommended items are items of a related type. For instance, if the image illustrates books or movies, the recommended items may be other books or movies that may be related to the illustrated books or movies (e.g., sequels, of the same genre, or with an actor, director, or author in common).

In some embodiments, the recommendation engine 352 may select the recommended items based on a physical area illustrated in the image. The physical area is generally, although not necessarily, at least partially bounded. For instance, the physical area may be a drawer, designated for storing particular items or a junk drawer (e.g., a location where a user places various odds and ends or items that may be unrelated to each other, but do not have an alternative storage location), a closet, a shelf on a wall or in a bookcase, or some area bounded on one or more planes. However, in some cases, the physical area may be relatively unbounded. For example, the physical area may be a location in a center of a room or in a yard, which may be bounded by the floor or ground, but unbounded on other planes.

According to some embodiments, the image may be any type of image that can be obtained by an optical device. For instance, the image may be a photograph or a frame of a video. The optical device may be a camera or other device capable of capturing an image. Further, the optical device may be a separate user device or may be a component of a user computing device 302. The recommendation engine 352 may analyze a copy of the image received at the interactive computing system 310 to develop its recommendations, or may use one or more additional systems (described below) hosted by the interactive computing system 310 to facilitate analyzing the image and developing the recommendations. Further, an image generator 358 may analyze a copy of the image received at the interactive computing system 310 to generate an alternative or supplementary visual representation of the items depicted in the image.

The interactive computing system 310 further includes an image acquisition system 322. The image acquisition system may include any system capable of receiving an image from a user computing device 302 and/or accessing an image from a data repository 340. The received image may be an image file, such as a JPEG, GIF, or bitmap file. In some cases, the received image is a frame from a streaming video or from a video file. Although illustrated as a separate component, in some cases, the image acquisition system 322 may be included in the servers 320.

To facilitate analyzing the image received by the image acquisition system 322, the interactive computing system 310 may include a spatial determination engine 354 and an item identification module 360. Further, to facilitate analyzing the image, the image may include an illustration of a reference marker. A reference marker may itself be an image or an image of an object. For example, the reference marker may include the printout or an image of a printout of a tracer image. This tracer image may include an image previously provided to the interactive computing system 310 to serve as a reference for analyzing images. For example, the tracer image may be a machine-readable code, such as a barcode or a two-dimensional code, such as a Quick Response Code ("QR code"). Alternatively, or in addition, the tracer image may be a unique image generated for the purpose of serving as the tracer image. For example, the tracer image may be a stylized drawing of a dragon or some other creature. Alternatively, or in addition, the reference marker may be an image of a reference object. The reference object may include any object whose dimensions or spatial characteristics are provided to the interactive computing system 310. For example, the reference object may be an image of a user computing device or a block of wood with known dimensions. In some cases, the reference marker is provided to the interactive computing system 310. Alternatively, or in addition, characteristics of the reference marker, such as the dimensions of lines, shapes, and angles included in the reference marker, are provided to the interactive computing system 310.

The spatial determination engine 354 may include a system capable of determining the dimensions of a physical area illustrated in a received image. The dimensions may be determined by comparing the depiction of the physical area included in the image with the depiction of the reference marker included in the image. Further, one or more computer vision techniques and color identification techniques may be implemented to facilitate determination of the boundaries of the physical area. Further, in some cases, the spatial determination engine 354 may be used to determine the size of items depicted in an image. For instance, the spatial determination engine 354 may compare an object to the reference marker or reference object to determine proportions of an item depicted in an image.

The item identification module 360 may include a system capable of identifying items illustrated in a received image. In some embodiments, the item identification module 360 can identify the types of items included in the received image, the number of items included in the received image, and the dimensions of items included in the received image. In some cases, the item identification module 360 identifies the items in the received image and the dimensions of the items identified by comparing the depiction of the items with images of the item in an electronic catalog provided by the catalog service 330. Alternatively, or in addition, dimensions for the depicted items may be determined by comparing the depiction of the items included in the image with the depiction of the reference marker included in the image. Further, one or more computer vision techniques and/or color identification techniques may be implemented to facilitate identifying items in the image or in distinguishing between multiple items in the image.

As previously described, augmented reality techniques can be used to present a modified version of a received image to a user. This modified version of the received image may overlay additional information over the image. For instance, an alternative visual representation of items included in the image may be displayed over the received image. Alternatively, or in addition, an alternative visual representation of a set of items included in the image may be presented in addition to or instead of the received image. The alternative visual representation of the set of items may include images of the items illustrated differently from the received image. For instance, items that are scattered throughout a received image may be ordered or organized and displayed within a user interface element. For instance, the items may be depicted in alphabetical order or alphanumeric order in a scroll wheel. To facilitate generation of the modified version of the received image and/or the alternative visual representation of the set of items, the interactive computing system 310 includes an image generator 358.

Image generator 358 may include a system capable of generating a two dimensional (2D) image and/or a three dimensional (3D) image based on a received image. Further, in some cases, the image generator 358 may use one or more models of items to facilitate generating a new image. The models of the items may include electronic models or images of the items. In some cases, the models are templates of items. These templates may be wireframes or partially formed models of items, which can be used to create models of items using information obtained, for example, from the received image. For instance, size, color, and texture information may be obtained from the received image and used in conjunction with the template of an item to create a 3D model of the item.

The image generated by the image generator 358 may be an interactive image. Further, the generated image may be created based on an ordering of items depicted in a received or captured image of the items. Moreover, the image generator 358 may generate individual images for each item depicted in the original image, or image under analysis, and insert the individual images into one or more user interface elements. For example, the image generator 358 may insert images of the items in a list or a stack. This list or stack of images may then be displayed on a display of a user computing device 302 next to the image under analysis.

In certain embodiments, the image generator 358 may generate a new visual representation of a set of items, or modify an existing visual representation of the set of items as an image received by the image acquisition system 322 changes. For example, if a user moves a user computing device 302 so that an image capturing device of the user computing device 302 obtains an updated image that depicts at least some different items from a previously captured image, the image generator 358 may modify an existing visual representation or create a new visual representation of the items illustrated in the updated image. Alternatively, in some cases, the image generator 358 may determine that the updated image includes the same items, albeit at a different location in the image, and may omit creating a new visual representation of the set of items depicted in the updated image.

The image splicer 356 may include a system capable of dividing an image into multiple portions. In some cases, the image generator 358 may use the image splicer 356 to divide portions of the image corresponding to one or more items and to use the divided portions of the image to create the alternative visual representation of the items. In some embodiments, the image splicer 356 may be omitted or optional because, for example, the image generator 358 obtains new images of the items depicted in the received image from, for example, the item data repository 346.

The interactive computing system 310 further includes an annotation module 364 and a complementary content module 362. The annotation module 364 can generally include any system that can annotate or modify a portion of an image. The annotations may include markings or drawings that are placed over a portion of the image. For example, an item selected by a user via, for example, the alternative visual representation of the items, may be circled in the image under analysis. Alternatively, or in addition, an arrow may be overlaid on the image that points to the selected item. The type of annotation is not limited and other examples of types of annotation may include shading or altering a shading of an item, adding shadow to an item, giving the item a three-dimensional appearance in the image, etc.

Moreover, the annotation is not limited to a static annotation. For example, the annotation may include an animation that illustrates movement of the item to draw the user's attention to the portion of the image with the item. As a second example, the annotation may include alternating between two or more representations of a portion of the image to create a flashing effect or a looping animation. For instance, this flashing effect may alternate between a representation that depicts the item at the location and a representation that does not depict the item. As a third example, the annotation may include cycling through different colors or shadings for the portion of the image depicting the item. Furthermore, the annotations are not limited to identifying a single item. In some cases, the image may be annotated to illustrate multiple occurrences of an item (e.g., toy cars) in an image, or multiple items (e.g., toys of different types) in the image. In some cases, the item may be rotated in the image to show an alternative view or a different side of the item that may facilitate the user identifying the item or confirming that the user selected the item that the user intended to select. For example, if the item is a DVD, a case of the DVD may be rotated from a view that displays a spine of the DVD case to a view that illustrated the front or back cover of the DVD case. In some cases, both the front and back cover may be displayed simultaneously.

The complementary content module 362 can generally include any system that can identify complementary content for an item. The complementary content can include a portion of the item (e.g., a few pages of a book or a few minutes of a video) and/or content related to the specific item (e.g., a movie trailer, a cast listing, a movie review, or a book review). Alternatively, or in addition, the complementary content can include content related to a different item that is recommended based on a selected item. For example, assuming the item is a movie, the complementary content may include a trailer for a sequel to the movie or a movie of the same genre. In some cases, the complementary content is another item, which may be included in a user's collection or not included in a user's collection that can be recommended by the recommendation engine 352.

The data repository system 340 can generally include any repository, database, or information storage system that can store information associated with items and users. This information can include any type of data, such as item descriptions, account information, customer reviews, item tags, or the like. Further, this information can include relationships between items, between users, and/or between items and users.

The data repository 340 can include a user data repository 342, an item models repository 344, and an item data repository 346. The user data repository 342 can store any information associated with a user including account information, user purchase information, user demographic data, item view information, user searches, identity of items owned by a user (e.g., purchased or obtained as a gift) or the like.

The item data repository 346 can store any information associated with an item. For example, the item data repository 346 can store item descriptions, customer reviews, item tags, manufacturer comments, service offerings, etc. In some embodiments, item data stored for at least some of the items identified in the item data repository 346 may include, but is not limited to, price, availability, title, item identifier, item feedback (e.g., user reviews, ratings, etc.), item image, item description, item attributes (such as physical dimensions, weight, available colors or sizes, materials, etc.), keywords associated with the item, and/or any other information that may be useful for presentation to a potential purchaser of the item, for identifying items similar to each other, and/or for recommending items to a user.

One or more of the user data repository 342 and the item data repository 346 can store any information that relates one item to another item or an item to a user. For example, the item data repository 346 can include information identifying items that were first available in a specific year, items that share an item classification, or items that share a sales ranking (e.g., items on top ten sales list by volume and/or by monetary sales numbers).

The item models repository 344 may store images representative of items included in an electronic catalog provided by the catalog service 330. The images may be 2D images or 3D images. Further, the images may serve as templates that can be used by the image generator 358 to create models of items and/or a composite image that can include multiple items and/or which may be joined or otherwise merged with an image provided by a user computing device 302 or otherwise generated by the image generator 358.

The various components of the interactive computing system 310 may be implemented in hardware, software, or combination of hardware and software. In some cases, some components may be implemented in hardware while other components of the interactive computing system 310 may be implemented in software or a combination of hardware and software. For example, in one embodiment, the image acquisition system 322 and the recommendation engine 352 may be implemented in hardware, while the image generator 358 and the image splicer 356 may be implemented in software. Further, the data repositories 340 may be implemented in the storage systems of the servers 320 or may be implemented in separate storage systems.

The user computing devices 302 can include a wide variety of computing devices including personal computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), kiosks, speaker systems, and various other electronic devices and appliances. Further, the user computing devices 302 can include any type of software (such as a web browser) that can facilitate communication with the interactive computing system 310. In some cases, a user may access the interactive computing system 310 via a network page hosted by the interactive computing system 310 or by another system. In other cases, the user may access the interactive computing system 310 via an application.

The network 304 may be a publicly accessible network of linked networks, possibly operated by various distinct parties. Further, in some cases, the network 304 may include the Internet. In other embodiments, the network 304 may include a private network, personal area network, local area network, wide area network, cable network, satellite network, cellular telephone network, etc., or combination thereof, each with access to and/or from an external network, such as the Internet.

The general architecture of the interactive computing system 310 may include an arrangement of computer hardware and software components as previously described that may be used to implement aspects of the present disclosure. The interactive computing system 310 may include many more (or fewer) elements than those illustrated. It is not necessary, however, that all of these elements be shown in order to provide an enabling disclosure. Further, the interactive computing system 310 may include a processing unit, a network interface, a computer readable medium drive, an input/output device interface, a display, and an input device, all of which may communicate with one another by way of a communication bus. The network interface may provide connectivity to one or more networks or computing systems. The processing unit may thus receive information and instructions from other computing systems or services via the network 304. The processing unit may also communicate to and from memory and further provide output information for an optional display via the input/output device interface. The input/output device interface may also accept input from the optional input device, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or other input device known in the art.

The memory may contain computer program instructions (grouped as modules or components in some embodiments) that the processing unit executes in order to implement one or more embodiments. The memory may generally include RAM, ROM and/or other persistent, auxiliary or non-transitory computer-readable media. The memory may store an operating system that provides computer program instructions for use by the processing unit in the general administration and operation of the interaction service. The memory may further include computer program instructions and other information for implementing aspects of the present disclosure. For example, in one embodiment, the memory includes a user interface module that generates user interfaces (and/or instructions therefor) for display upon a computing device, e.g., via a navigation interface such as a browser or application installed on the computing device. In addition, memory may include or communicate with an image data repository, a dimension data repository, and/or one or more other data stores.

Further, although certain examples are illustrated herein in the context of an interactive computing system 310 that communicates with a separate user computing device 302, this is not a limitation on the systems and methods described herein. It will also be appreciated that, in some embodiments, a user computing device 302 may implement functionality that is otherwise described herein as being implemented by the elements and/or systems of the interactive computing system 310. For example, a user computing device 302 can identify the location of items within an image and create an alternative visual representation of the items to facilitate locating the items in the physical world without communicating with a separate network-based system, according to some embodiments.

Example Organizer Preview Process

Figure 4:
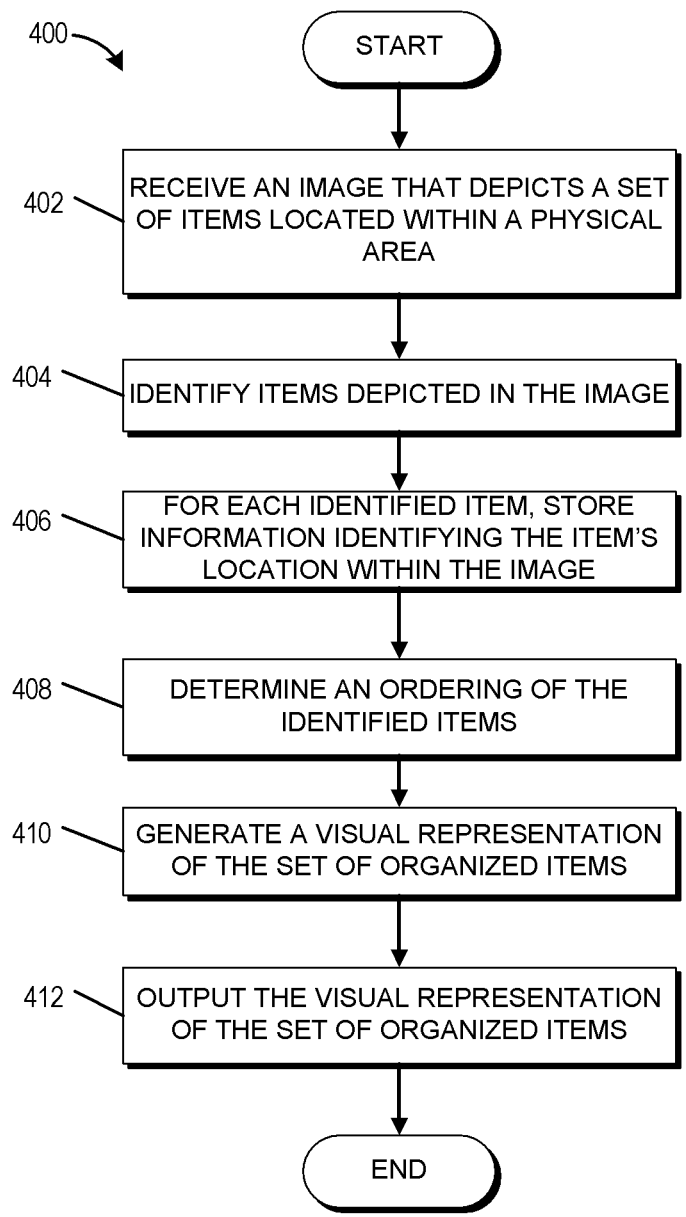
FIG. 4 is a flowchart of an illustrative embodiment of an item presentation process that may be implemented by an interactive computing system.

FIG. 4 is a flowchart of an illustrative embodiment of an item presentation process 400. The process 400 can be implemented by any system that can generate an alternative visual presentation of a set of items depicted in an image. For example the process 400, in whole or in part, can be implemented by an interactive computing system 310, an image acquisition system 322, a recommendation engine 352, a spatial determination engine 354, an image splicer 356, an image generator 358, an item identification module 360, a complementary content module 362, and/or an annotation module 364, to name a few. Although any number of systems, in whole or in part, can implement the process 400, to simplify the discussion, portions of the process 400 will be described with reference to particular systems.

The process 400 begins at block 402 where, for example, the image acquisition system 322 receives, or otherwise accesses, an image that depicts a set of items located within a physical area. The image is not limited in type and may include a static image, such as a photograph, or set of images, such as one or more frames from a video. Further, in some cases, the image may optionally include an image of a reference marker or reference item. The reference marker may be or may include an object with spatial characteristics previously provided to the interactive computing system 310. For example, the reference marker may be a tracer printout or a printout of an image with a particular size known by or previously provided to the interactive computing system 310. For instance, although not limited as such, the reference marker may be a fanciful design or a machine-readable code, such as a barcode, QR code, matrix code, and the like. In some cases, the reference marker may be a three-dimensional object, such as a block of wood, or other item for which the interactive computing system 310 has stored dimension information, or a user computing device 302, with dimensions provided to the interactive computing system 310. The dimensions of the reference marker may be provided by an administrator or a customer user. Further, the reference marker may include an item from the set of items at a particular location in the image. This particular location may be identified by analyzing the image to locate the reference marker or may be a location within the image identified by a user, such as the center of the image or a particular corner of the image.

In some cases, the physical area may include a partially bounded physical area. The partially bounded physical area may include an area designated by a user for storing the set of items. For example, the partially bounded physical area may be a storage space, such as a closet, a drawer, a shelf, or set of shelves, and the like. However, embodiments disclosed herein are not limited to use with a bounded physical area. For example, embodiments disclosed herein may be used with an open space in a room or in a space external to a building, such as a backyard. Thus, in certain embodiments, the image received at the block 402 may illustrate a set of items in an unbounded space.

At block 404, the item identification module 360 identifies items depicted in the image received at the block 402. Identifying the items depicted in the image can include identifying a location of the items in the image. The identified location may be an absolute location with respect to an origin point for the image. This origin point may be the center of the image, a particular corner of the image, or any other location within the image. Alternatively, or in addition, the identified location may include a relative location with respect to another item or object within the image. Furthermore, a location of an item may include a direction relative to the origin point and/or a reference item within the image. For example, a location for an item may include one or more the following: a number of units (e.g., inches, centimeters, pixels, etc.) from an origin point, a reference item (e.g., a particular screwdriver, a particular DVD, etc.), or a reference marker (e.g., a printout of a QR code, etc.); and/or north or northeast from an origin point or a reference item.

In some cases, determining the location of the item includes determining a boundary that represents the perimeter of an item in the image. In other cases, determining the location may include determining one or more points within the item or that correspond to the item, such as the corners or vertices of the item, the center of the item, etc. Further, determining the location of the item may include determining the coordinates of a polygon that can be substituted for the item or that could a threshold percentage of the item if laid over the item. This polygon may be a particular polygon, such as a system-defined or user-defined polygon. Alternatively, the polygon may be selected from a set of polygons that, if laid over the item, is determined to have the best fit for an item where the best fit may include a polygon that covers the greatest percentage of the item and/or that covers a threshold percentage of the item while covering less than a threshold of portion of the image that does not include the item.

Further, identifying items depicted in the image may include identifying one or more types or categories for each item depicted in the image. In some embodiments, the block 404 includes distinguishing one item from another item in the set of items depicted in the image. Distinguishing one item from another item may include distinguishing a portion of the image that depicts the one item from a portion of the image that depicts the other item. Some example processes that may be used with respect to the block 404 are described in more detail below with respect to FIG. 5.

For each item identified at the block 404, the item identification module 360 stores information identifying the item's location within the image at block 406. This information may include any of the location information previously described with respect to the block 404. Further, the block 406 may include storing any identification information determined at the block 404. The location information may be stored at one or more repositories of the data repository 340, such as the item data repository 346.

At block 408, the item identification module 360 determines an ordering, grouping and/or other organization for the identified items. The ordering criteria used to determine an order of the items may be determined programmatically and/or based on ordering criteria selected by a user. Further, the ordering criteria may include one criterion or multiple criteria. The ordering criteria can include one or more of the name of the items, the type of the items, the size of the items, the usage context for the items, the brand of the items, etc. For example, the items may be ordered alphabetically by the name of the items and/or by the brand name for the items. As a second example, the items may be ordered by the type of task that can be performed by the items. For instance, supposing that the items are a set of tools, the items may be ordered by the type of material they can be used with (e.g., wood, metal, plastic, etc.) and/or the type of task for which the tools can be used (e.g., cutting, creating holes, binding items together, etc.). Thus, continuing this example, one particular ordering may result in saws and saw blades being ordered together, drills being ordered together and subsequent to the saws and saw blades, and screwdrivers being ordered together and subsequent to the drills. Further, unidentifiable items may be ordered prior to or subsequent to the identified items. In some implementations, items may be ordered based on their location within the image under analysis. For example, if the image includes a number of board games stacked on a shelf, the board games may be organized in the visual representation (described below with respect to block 410) based at least in part in the order that the board games are stacked on the shelf. As another example, items may be organized based on the quadrant the items are located in the image. In other words, in some cases, items in the upper left of an image may be listed before items in the upper right of the image, which may be listed before items in the lower right of the image. Alternatively, items may be organized randomly or not organized.

At block 410, the image generator 358 generates a visual representation of the set of organized items ordered at the block 408. The visual representation of the set of organized items can include any type of alternative visual representation that is an alternative to the image received or accessed at the block 402. For example, the visual representation of the set of organized items can include a scroll wheel or a ribbon that includes distinct images or thumbnails for the items identified at the block 404. In some cases, items may be grouped together and represented by a single image or thumbnail within the visual representation of the set of items. In some such cases, the grouped items may be depicted separately in response to a command or an interaction with the grouped items by, for example, a user. For instance, a user may select an item group that include a number of items and in response to the selection of the item group, the visual representation of the set of organized items may be modified to separately depict the items included in the item group. As will be appreciated, it is not necessary that every identified item from the image be included in the visual representation generated at the block 410.

The visual representation of the items generated at the block 410 may represent each item by using a portion of the image received at the block 402 that includes the item. Advantageously, in certain embodiments, by using the portion of the image that includes the item, unique aspects of the item, such as scratches, dents, writing, or other modifications to the item are included in the visual representation of the set of organized items generated at the block 410. Further, by using the portion of the image that includes the item, the item may be depicted in the visual representation of the set of organized items at the same angle as the items depicted in the image received at the block 402. Alternatively, in some implementations, an item may be depicted in the visual representation generated at the block 410 using a generic or stock representation of the item based on an image or model for the item stored at the item models repository 344.

In some embodiments, generating the visual representation of the set of organized items may include rotating or otherwise altering a representation or image of an item to match how the item is depicted in the image received at the block 402. Further, in some implementations, generating the visual representation of the set of organized items may include associating or linking complementary content with the representation of at least some of the items included in the visual representation generated at the block 410. This complementary content may be accessed based on an interaction by the user with the visual representation of the set of organized items. Further, the complementary content may include a variety of content that may be associated with a particular item. For example, if an item is a movie, the complementary content may include a trailer for the movie, cast information for the movie, or a recommendation of another movie based at least in part on the item.

At block 412, the image generator 358 outputs the visual representation of the set of organized items generated at the block 410. Outputting the visual representation of the set of organized items may include providing the visual representation to a user computing device 302. The visual representation may be displayed on a display of the user computing device 302. In some cases, the visual representation may be displayed next to, including above or below, the display of the image received at the block 402. Alternatively, the visual representation may be displayed on top of the display of the image received at the block 402. In some such cases, the visual representation of the set of organized items may be at least partially transparent. In other cases, the visual representation of the set of organized items may be opaque. Alternatively, or in addition, the visual representation of the set of organized items may be displayed separately from the image received at the block 402. Displaying the visual representation of the set of organized items separately may include displaying the visual representation of the set organized items while not displaying the image received at the block 402. Alternatively, the visual representation of the set of organized items may be displayed on a separate user computing device 302 from a user computing device 302 that displays the image received at the block 402.

Although the representation generated at the block 410 is generally described as a visual representation, the present disclosure is not limited as such, and other representations may be used. For example, the block 410 may include generating an audio representation of the identified items, such as audio stating the name of each item identified at the block 404. In such cases, the block 412 may include outputting or playing the audio. Further, in such cases, the user may select an item by speaking the name of, or other label for, the item.

Generally, although not necessarily, the image capturing device of a user computing device 302 may be capturing an image feed or a set of images over time or on a continuous basis as may occur, for example, when recording a video. Further, at the block 402, the image acquisition system 322 may be continuously or continuously receiving the image feed as may occur when receiving streaming frames of a video. Thus, as the image capturing device and/or the user computing device 302 is moved, the image captured and provided to the image acquisition device at the block 402 may change. In some such cases, the process 400 is repeated with each new iteration of a received image or with each received frame of a video. In some cases, the process 400 is repeated at a particular rate, but not necessarily with each received frame. For instance, the process 400 may be repeated for every 5 or for every 10 frames received.

Further, in some embodiments, portions of the process 400 may be omitted or modified during some iterations of performing the process 400. For instance, in response to a first image or frame being received at the block 402, a set of items may be identified (e.g., at the block 404) and a location for at least some of the items within the image may be stored (e.g., at the block 406). However, during subsequent iterations of the process 400 with respect to subsequently received image frames, it may be unnecessary to re-identify item types. Further, the location of the items may or may not need updating based on the type of location information stored and whether or not the subsequently received image frames are of a new view of a location.

Example Item Identification Process

Figure 5:
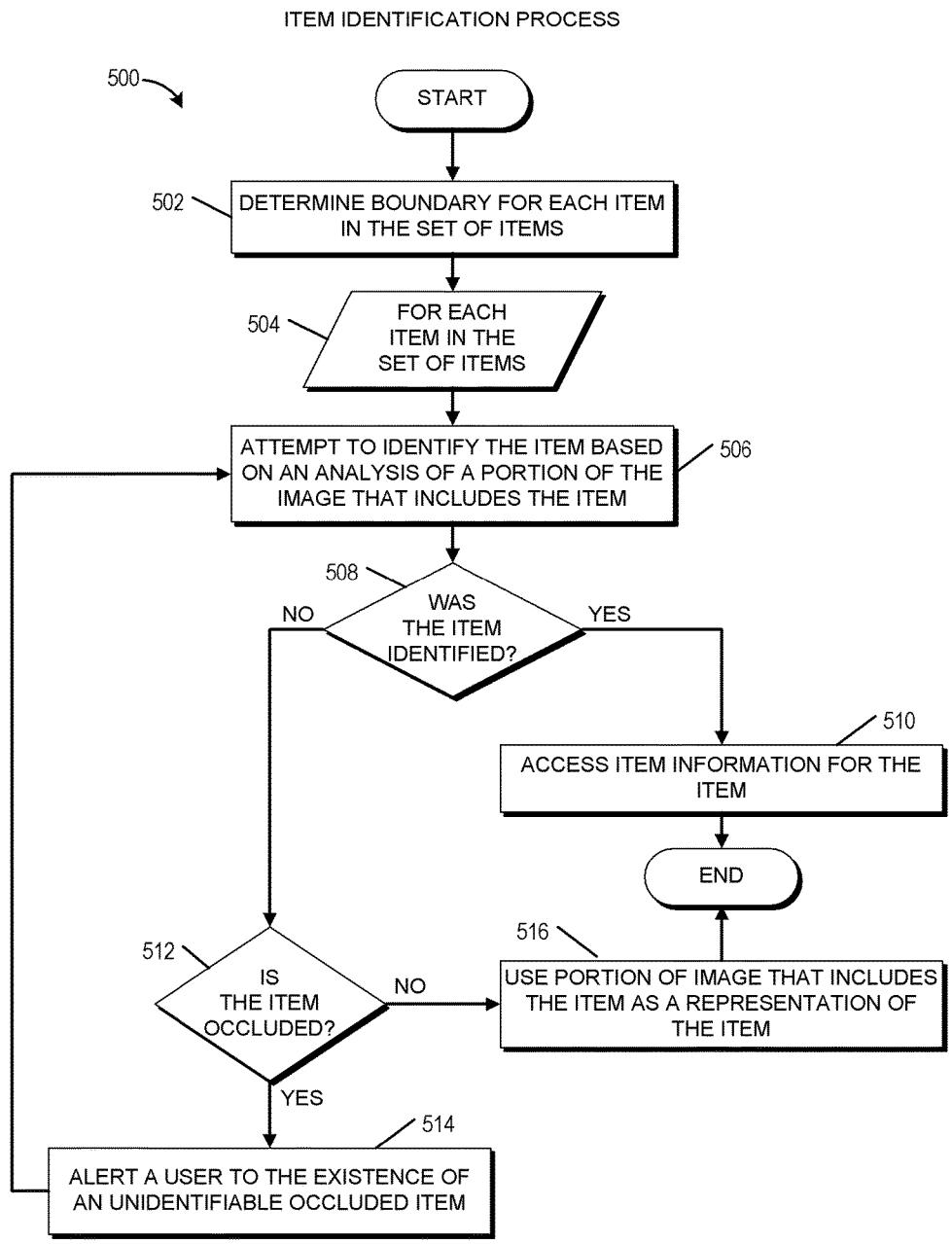
FIG. 5 is a flowchart of an illustrative embodiment of an item identification process that may be implemented by an interactive computing system.

FIG. 5 is a flowchart of an embodiment of an item identification process 500. The process 500 can be implemented by any system that can identify one or more items in an image. Identifying the items may include identifying a type of the item and/or a location of the item within the image. For example the process 500, in whole or in part, can be implemented by an interactive computing system 310, an image acquisition system 322, a recommendation engine 352, a spatial determination engine 354, an image splicer 356, an image generator 358, an item identification module 360, a complementary content module 362, and/or an annotation module 364, to name a few. Although any number of systems, in whole or in part, can implement the process 500, to simplify the discussion, portions of the process 500 will be described with reference to particular systems.

In certain embodiments, the process 500 may be used in conjunction with the process 400. For example, some or all of the process 500 may be performed as part of the block 404. Further, the process 500 may begin or be performed after an image is received at the block 402 as previously described above with respect to FIG. 4.

The process 500 begins at block 502 where, for example, the item identification module 360 determines a boundary for each item in a set of items depicted in an image received, for example, at the block 402 of FIG. 4. To simplify further discussion, and not to limit the present disclosure, the image received at the block 402 may be referred to as the "image under test" or the "image under analysis." In some cases, the block 502 is performed for a subset of items included in the image under analysis. The block 502 may include performing one or more computer vision algorithms to differentiate an image of an item from other portions of the image under analysis.

Further, the block 502 may include filtering out indistinguishable items, a background in the image under analysis, or other portions of the image under analysis that is unrecognizable. In some embodiments, unrecognizable portions of the image under analysis may be circled or otherwise annotated and presented to a user. In such cases, the item identification module 360 may receive an indication from the user of an item type for an unrecognizable portion of the image under analysis or may receive an indication that the unrecognizable portion of the image under analysis is to be ignored for the purposes of performing the process 500.

As indicated by the block 504, the remainder of the process 500 is performed for each individual item, or for at least some of the items, in the set of items whose boundary is determined at the block 502. This can include, in some cases, processing a plurality of items, at least initially, as a single item due, for example, to at least partial occlusion of one item by another item. It should be understood that each item may be processed sequentially or at least partially in parallel. Further, it should be understood that the process 500 may process a subset of items illustrated in the image under test. To simplify discussion, the remainder of the process 500 will be described with respect to a single item. However, it should be understood that multiple related or unrelated items may be processed by the process 500. For example, a pair of shoes or a number of spoons may be processed separately or at least partially together by the process 500.

At the block 506, the item identification module 360 attempts to identify the item based on an analysis of a portion of the image under test that includes the item. A number of image analysis techniques may be performed sequentially or at least partially in parallel to identify the item. For example, the portion of the image under test that includes the item may be analyzed to identify a machine-readable code, such as a barcode, QR code, or other unique code that may be used for identification or inventory purposes. If a machine-readable code is identified, the item may be identified based on the machine-readable code by, for example, accessing an electronic catalog provided by the catalog service 330.

As a second example, a portion of the image under test may be processed by an OCR process to determine whether the portion of the image includes text. If text is identified, a search of the electronic catalog may be performed using the text in an attempt to identify the item. Further, in some cases, the text may be supplied to a search engine that may search one or more network sites including, in some cases, network sites hosted on the Internet in an attempt to identify the item.

As a third example, a portion of the image under test may be processed using one or more image comparison algorithms to determine whether a portion of the image under test matches an image of a known item. The images of the known item may include images of items in an electronic catalog provided by the catalog service 330. As will be appreciated, one or more transformations may be applied to the portion of the image prior to or during the comparison to images of known items in order to account for an angle of the camera that captured the image.

In some cases, the image analysis may include creating a fingerprint of the portion of the image under test that includes the item. This fingerprint may be based on identifiable characteristics of the item in the portion of the image under test. For example, the fingerprint may include a location of vertices that define a tracing or wireframe of the item in the image. Further, the fingerprint may include the identity of colors corresponding to portions of the item. The fingerprint for the item may then be compared to fingerprints of items included in the electronic catalog to identify the item or a category for the item.

Moreover, the block 506 may include identifying a location of the item in the image. The location of the item may be an absolute or relative location within the image as previously described with respect to the block 404.

At the decision block 508, the item identification module 360 determines whether the item was identified. If the item was successfully identified, the item identification module 360 identifies item information for the item at block 510. Identifying item information for the item may include identifying an image for the item or an item model that may be used to generate an image for the item to be used in an alternative visual representation of the items depicted in the image under test, as previously described with respect to the block 410. The image and/or item model for the item may be accessed from a repository, such as the item models repository 344, and/or from an electronic catalog generated by the catalog service 330. Further, the item information accessed or obtained at the block 510 may include the size of the item, the type of the item, a name of the item, a brand name of the item, a model of the item, a rating of the item, or any other information that may be used to facilitate ordering or organizing the items depicted in the image under analysis, as previously described with respect to the block 408.

In some embodiments, the block 510 may optionally include using the complementary content module 362 to identify complementary content for the identified item. The complementary content may include a variety of related content for the item and may be determined based at least in part on the item type of the item. In some cases, a user may specify whether to obtain complementary content and/or the type of complementary content to obtain for presentation to the user. Some non-limiting examples of complementary content can include movie or television trailers (for the item or for alternative items), reviews, recommendations, cast information, additional or bonus content for an item (e.g., commentary, deleted scenes, etc.), etc.

If it is determined at the decision block 508 that the item was not successfully identified, the item identification module 360 attempts to determine whether the item is occluded at the decision block 512. The item may be identified as occluded if the item is partially obscured from view by another item, but enough of the item is viewable by an image acquisition device of a user computing device 302 for the item identification module 360 to determine that multiple items may be included in a portion of the image under analysis. For example, suppose that the image under analysis includes a shoe that is 90% covered by a blanket. The item identification module 360 may determine that an item exists under the blanket based on the 10% of the shoe that is not covered by the blanket. However, in some cases, the item identification module 360 may be unable to determine that the covered item is a shoe. Moreover, in some cases, the item identification module 360 may be unable to distinguish between an unidentifiable item and an occluded item.

In some cases, the unidentified occluded item may be ignored. However, in other cases, the item identification module 360 alerts a user to the existence of the unidentifiable occluded item at the block 514. Advantageously, in certain embodiments, by alerting the user of the unidentifiable occluded item, the user may de-occlude the item, or uncover the item, in the physical environment and capture a new image of the adjusted environment, such that the item identification module 360 may determine the type of the previously occluded item. The item identification module 360 may alert the user to the occluded item by using a bounding box or other user interface feature to annotate a portion of the image under analysis that includes the unidentified included item. In some cases, the user may indicate that the item is not occluded. In some such cases, the user may provide an identity of the item.

In some embodiments, one or more systems implementing the process 500 may wait or pause until the user de-occludes the item. In other cases, the occluded item may be ignored. In yet other cases, the occluded item and a second item occluding the occluded item may be treated as a single unrecognizable item and may be processed as described below with respect to the block 516. Thus, in certain embodiments, the block 506 may be omitted or optional.

If it is determined at the decision block 512 that the item is not occluded, the image generator 358 uses a portion of the image that includes the item as a representation of the item at block 516. This representation of the item can be used in generating the visual representation of the organized items, as previously described with respect to the block 410. In some cases, the portion of the image that includes the item may be rotated or otherwise modified. In other cases, the portion of the image that includes the item is used without modification as a representation of the item in an alternative visual representation of a set of items depicted in the image.

As previously described, in some cases, items may be organized by size in the visual representation of the items created at the block 410. For example, a set of screwdrivers may be organized by the length of the shank or by the thickness of the blade and/or tip. In some such cases, the block 516 may include using the spatial determination engine 354 to determine the size of the unidentified item using an image of a reference marker or reference item as a size reference. The portion of the image that includes the unidentified item may be compared to the portion of the image that includes the reference marker. As the spatial characteristics of the reference marker are typically, although not necessarily, known (e.g. stored at the data repository 340), the spatial determination engine 354 may determine the size of the unidentified item based on a comparison of the image of the item to the image of the reference marker. In some embodiments, the collective size of multiple items may be determined at the block 516 instead of determining individual sizes of each item. For example, if the item identification module 360 is unable to separate a pair of items, the pair of items may effectively be treated as a single item for purposes of the process 500.

Moreover, in some embodiments, the spatial determination engine 354 may determine a size of an item that was successfully identified. For example, the spatial determine engine 354 may determine the size of an identified item whose size is not included in an item data repository 346.

Example Organizer Preview Process

Figure 6:
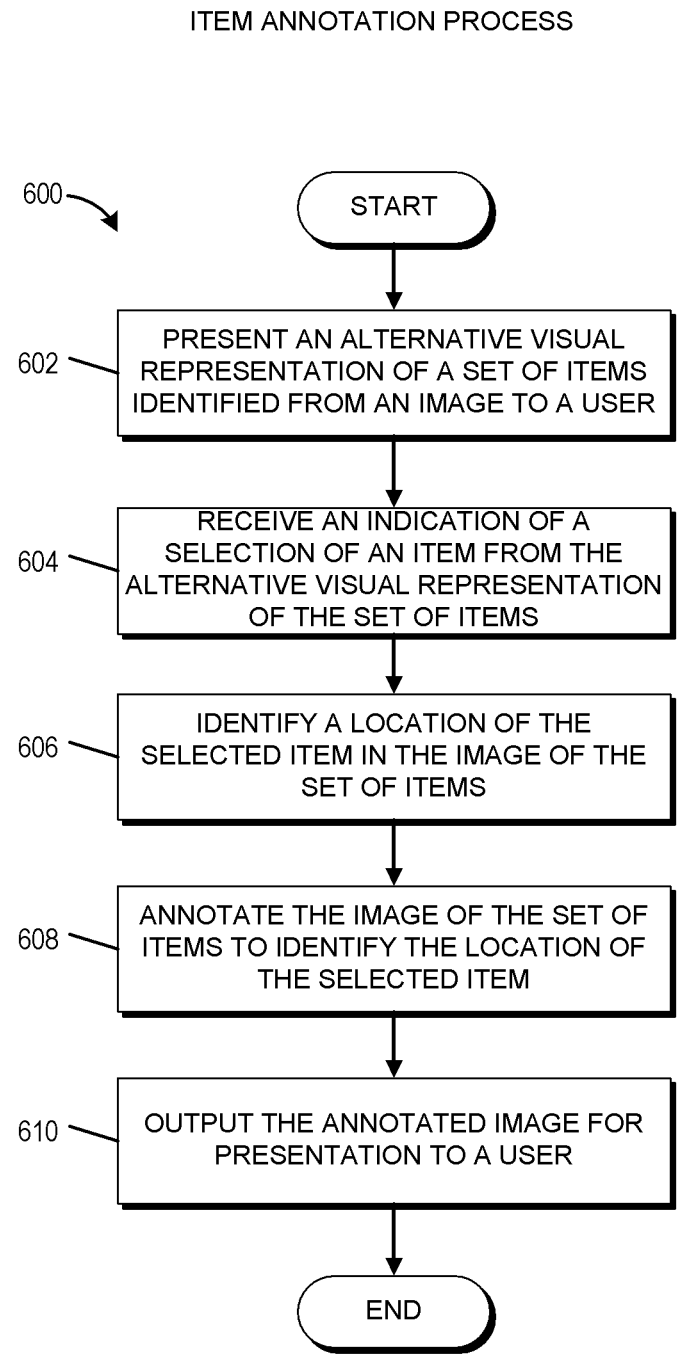
FIG. 6 is a flowchart of an illustrative embodiment of an item annotation process that may be implemented by an interactive computing system.

FIG. 6 is a flowchart of an illustrative embodiment of an item annotation process 600. The process 600 can be implemented by any system that can annotate an image to identify a location of an item selected from an alternative visual representation of items included in the image. For example the process 600, in whole or in part, can be implemented by an interactive computing system 310, an image acquisition system 322, a recommendation engine 352, a spatial determination engine 354, an image splicer 356, an image generator 358, an item identification module 360, a complementary content module 362, and/or an annotation module 364, to name a few. Although any number of systems, in whole or in part, can implement the process 600, to simplify the discussion, portions of the process 600 will be described with reference to particular systems.

In certain embodiments, the process 600 may be used in conjunction with the process 400. For example, some or all of the process 600 may be performed as part of the block 412, or subsequent to the block 412.

The process 600 begins at block 602 where, for example, an image generator 358 presents an alternative visual representation of a set of items identified from an image to a user. Presenting the alternative visual representation of the set of items to the user may include outputting the alternative visual representation to a user computing device 302, which can present the alternative visual representation to the user. Further, the alternative visual representation of the set of items may be an organized representation of the items as described with respect to the process 400.

At block 604, the annotation module 364 receives an indication of a selection of an item from the alternative visual representation of the set of items. The indication of the selection of the item may be received in response to one or more interactions with the alternative visual representation of the set of items by the user at a user computing device 302. For example, a user may select an item by touching an image or a thumbnail of the item in the alternative visual representation of the set of items using a touchscreen display of the user computing device 302. As another example, a user may press a button on a keyboard or on a mouse when a representation of the item is highlighted or when a cursor is over a representation of the item in the alternative visual representation of the set of items.

At block 606, the annotation module 364 identifies a location of the selected item in the image of the set of items. The location of the selected item may be determined by accessing the data repository 340 that stores locations of items within a received image as previously described with respect to the process 400. Alternatively, or in addition, the annotation module 364 may analyze the image to determine an absolute or relative location of the selected item within the image in response to receiving the indication of the selection of the item at the block 604.

At block 608, the annotation module 364 annotates the image of the set of items to identify the location of the selected item to a user. Annotating the image may include circling the selected item or otherwise marking a portion of the image with the selected item to facilitate the user's identification of the location of the item within the image. Alternatively, or in addition, annotating the image may include animating a portion of the image that includes the selected item. For example, supposing that the selected item is a DVD case that is located on a shelf of DVD cases, annotating the image may include generating an animation that depicts the selected DVD case being removed from the shelf. Further, the animation may include turning or otherwise repositioning the DVD case in the image to display the front of the DVD case. Advantageously, in certain embodiments, because the image is a representation of a physical area, annotating the location of the item within the image facilitates a user locating the item in the physical area. Thus, for example, annotating a location of a particular DVD in an image of a shelf that includes a number of DVDs enables a user to more easily locate the DVD on the physical shelf or in the real world as opposed to the digital world (e.g., the image of the shelf).

In certain embodiments, the block 608 may include annotating or otherwise modifying the visual appearance of the selected item in the alternative visual representation of the set of items. For example, an image of the selected item in the alternative visual representation of the set of items may be given a raised appearance or a different shading.

At block 610, the image generator 358 outputs the annotated image for presentation to a user. The annotated image may be presented to the user on a display of a user computing device 302. In some cases, the annotated image is presented to the user on the display of the user computing device 302 while an image capturing device of the user computing device 302 is capturing an image of the physical area illustrated in the annotated image. Thus, in certain embodiments, the image displayed to the user on the user computing device 302 may be an augmented image that includes additional information compared to the image captured by the image capturing device of the user computing device 302. This additional information may, in certain embodiments, enable a user to locate an item in the real world using the augmented or annotated image that the user may have trouble locating due to, for example, the number of items located in the physical area.

In some cases, the annotated image is presented to the user on the display of the user computing device 302 at a different point in time than when an image capturing device captured the image of the physical area illustrated in the annotated image. For instance, in some implementations, one or more of the processes 400, 500, and 600 may be performed based on an image stored in memory at a time that differs from when the image was captured by an image capturing device (e.g., a camera). In some such cases, the image capturing device that captured the image of the physical area may be a different user computing device than the user computing device 302 displaying the annotated image to the user.

In some embodiments, the block 610 may include outputting an identification of a location of the selected object with respect to a reference point in the image or a reference item in the image. This location may be an absolute location or a relative location that is relative to a particular item or position in the image. In some cases, the location can include directional information that indicates a direction relative to a reference point. For example, the block 610 may include causing a dialog box to be presented to the user on the user computing device 302 that indicates that the selected item is south of center of the image, near the top right corner of the image, or left of a reference item in the image.

Furthermore, the block 610 may include outputting complementary content to the user. For example, if the selected item is a movie, a trailer for the movie or an alternative recommend a movie may be presented to the user. As another example, if the selected item is a roll of tape that has less than a threshold amount of tape remaining on the roll, which may be determined for example based on a diameter of the roll of tape, the complementary content may include an offer to purchase another roll of the tape or a link to a network page for purchasing another roll of the tape.

In some embodiments, the process 600 may be repeated, at least in part, as new images are captured and/or received at the block 402. For instance, if a stream of image frames from an image feed are received, the process 600 may be repeated continuously, repeatedly, or intermittently such that each new image displayed to the user includes an annotation of a selected item. Thus, the annotation applied to the image may be repeatedly updated to track the location of an item as the stream of received images is obtained. In some such cases, portions of the process 600 may be omitted during some iterations. For instance, the block 604 may be performed during a particular iteration of the process 600, but may be omitted during at least some subsequent iterations of the process 600. Further, the block 606 may include tracking the location of an item within a set of images by, for example, comparing differences between image frames and adjusting the annotation at the block 608 to maintain a location of the annotation with respect to a selected item.

In some cases, multiple items may be selected from an image or from a set of images depicting a physical area with a set of items. In some cases, as each item is selected, the previously selected item may be deselected. When the previous item is deselected, the annotation may be removed from an image presented to a user. In other cases, multiple annotations may be displayed to a user identifying each of the selected items.

In some cases, a user may move a user computing device 302 that is capturing an image or stream of images of a set of items in a particular location. As a result of the movement, some items that were previously identified and/or annotated using, for example, the processes 400, 500, and 600, may no longer appear in the image. For example, an item on the left edge of an image may not appear in a subsequent image if the user computing device is turned or moved to the right. In some such cases, the item identification module 360 may continue to store a relative location of an item depicted in an initial image with respect to a reference item or other items included in subsequent images. Further, the item, or a representation thereof, may continue to appear in an alternative visual representation (e.g., scroll wheel, collapsible list, etc.) of items.

Thus, in some cases, if the user selects an item using the alternative visual representation of the items that is no longer viewable in a currently displayed image, directional information or other location information may still be available to provide to the user. For example, continuing the previous example, the user may be informed that the item that was on the left edge of initial image may be located by moving the user computing device 302 back to the left. This information may be presented to the user by, for example, including an annotation of an arrow pointing to the left on the currently presented annotated image. This arrow may remain in the stream of annotated images presented to the user until the user has moved the user computing device 302 a sufficient amount to the left for the selected item to be viewable by the image acquisition device of the user computing device 302. Once the item is again viewable by the image acquisition device, the arrow may be replaced in the stream of annotated images presented to the user with an alternative annotation (e.g., a dashed circle around the selected item) identifying the location of the selected item.

Further, in some cases, the location depicted in an image may have a large number of items. In some such cases, a user may find that it is difficult to locate items or focus on a particular portion of a captured image when the number of items exceeds a threshold amount, which may be a user-dependent threshold. Thus, in some embodiments, a user may select a focal point in the image and/or a focus area of a particular size that is less than the size of the image. In some cases, the focus area is automatically centered at the center of the captured image and is restricted to a particular area of the image that is less than the entire image. In some implementations, the processes 400, 500, and 600 may be limited to the focus area selected by the user or automatically selected by the interactive computing system 310. Thus, for example, the alternative visual representation of items may show a subset of items depicted in the captured image instead of all the items that may be depicted in the image. Thus subset of items may be determined based on which items are within the identified sub-portion of the image.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by a user computing device comprising one or more hardware processors and configured with specific computer-executable instructions,
obtaining a continuous stream of images that depict at least a plurality of items located within a physical area, wherein the continuous stream of images are obtained from an image capturing device configured to capture the continuous stream of images;
identifying the plurality of items depicted in the continuous stream of images;
generating an interactive user interface element comprising a representation of the plurality of items that differs from a presentation of the plurality of items within the continuous stream of images and differs from a presentation of the plurality of items within the physical area;
outputting for display to a user the continuous stream of images and the interactive user interface element;
receiving, in response to interaction by a user with a portion of the interactive user interface element, a selection of a representation of an item from the plurality of items included in the representation of the plurality of items; and
for at least a subset of images of the continuous stream of images output for display, animating at least a portion of each of the subset of images, the portion including a depiction of an item corresponding to the representation of the item selected from the interactive user interface element.

2. The computer-implemented method of claim 1, wherein said outputting for display comprises outputting the continuous stream of images and the interactive user interface element on a display of a device that includes the image capturing device.

3. The computer-implemented method of claim 2, wherein the user computing device includes one of or both of the display and the image capturing device.

4. The computer-implemented method of claim 1, wherein, in response to receiving the selection of the representation of the item, the method further comprises:
identifying complementary content associated with the item; and
outputting the complementary content on a display.

5. The computer-implemented method of claim 1, wherein said animating comprises moving the depiction of the item within the subset of images.

6. The computer-implemented method of claim 1, wherein said animating comprises presenting different depictions of the item within different images of the subset of images.

7. The computer-implemented method of claim 1, wherein said animating comprises animating different portions of each of the subset of images to reflect changes in a relative position of the depiction of the item within the continuous stream of images as the image capturing device moves.

8. The computer-implemented method of claim 1, further comprising annotating the depiction of the item within the continuous stream of images output for display.

9. A system comprising:
an electronic data store configured to at least store specific computer-executable instructions;
an image capturing device configured to capture a continuous stream of images; and
a computing device comprising computer hardware in communication with the electronic data store and the image capturing device, the computing device configured to execute the specific computer-executable instructions to at least:
obtain the continuous stream of images from the image capturing device, the continuous stream of images depicting at least a plurality of items located within a physical area;
identify the plurality of items depicted in the continuous stream of images;
generate an interactive user interface element comprising a representation of the plurality of items that differs from a presentation of the plurality of items within the continuous stream of images and differs from a presentation of the plurality of items within the physical area;
output for display the continuous stream of images and the interactive user interface element;
receive, in response to interaction with the interactive user interface element, a selection of a representation of an item from the plurality of items included in the representation of the plurality of items; and
for at least a subset of images of the continuous stream of images output for display, animate at least a portion of each of the subset of images, the portion including a depiction of an item corresponding to the representation of the item selected from the interactive user interface element.

10. The system of claim 9, wherein the computing device comprises one or both of the image capturing device and the electronic data store.

11. The system of claim 9, wherein the computing device is further configured to output the continuous stream of images and the interactive user interface element on a display of the computing device.

12. The system of claim 9, wherein, in response to receiving the selection of the representation of the item, the computing device is further configured to execute the specific computer-executable instructions to at least:
identify complementary content associated with the item; and
output the complementary content on a display.

13. The system of claim 9, wherein the computing device is further configured to animate the at least a portion of each of the subset of images by at least moving a location of the depiction of the item within at least some of the subset of images.

14. The system of claim 9, wherein the computing device is further configured to animate the at least a portion of each of the subset of images by at least presenting different depictions of the item within different images of the subset of images.

15. The system of claim 9, wherein the computing device is further configured to animate the at least a portion of each of the subset of images by at least animating different portions of each of the subset of images to reflect changes in a relative position of the depiction of the item within the continuous stream of images as the image capturing device moves.

16. The system of claim 9, wherein the computing device is further configured to execute the specific computer-executable instructions to at least annotate the depiction of the item within the continuous stream of images output for display.

17. A computer-readable, non-transitory storage medium storing computer executable instructions that, when executed by one or more computing devices, configure the one or more computing devices to perform operations comprising:

receiving a continuous stream of images from an image capturing device, the continuous stream of images depicting at least a plurality of items located within a physical area;

identifying the plurality of items depicted in the continuous stream of images;

generating an interactive user interface element comprising a representation of the plurality of items that differs from a presentation of the plurality of items within the continuous stream of images;

outputting for display the continuous stream of images and the interactive user interface element;

receiving, in response to interaction with the interactive user interface element, a selection of a representation of an item from the plurality of items included in the representation of the plurality of items; and for at least a subset of images of the continuous stream of images output for display, animating at least a portion of each of the subset of images, the portion including a depiction of an item corresponding to the representation of the item selected from the interactive user interface element.

18. The computer-readable, non-transitory storage medium of claim 17, wherein the operations further comprise:

identifying complementary content associated with the item; and outputting the complementary content on a display.

19. The computer-readable, non-transitory storage medium of claim 17, wherein said animating comprises moving a location of the depiction of the item within at least some of the subset of images.

20. The computer-readable, non-transitory storage medium of claim 17, wherein the continuous stream of images depicts at least one additional item other than the plurality of items.

\* \* \* \* \*